United States Patent
Somers et al.

(10) Patent No.: US 9,569,125 B2
(45) Date of Patent: Feb. 14, 2017

(54) MAPPING OBJECT INTERFACE INTO A POWERED STORAGE DEVICE SYSTEM

(71) Applicant: Spectra Logic Corporation, Boulder, CO (US)

(72) Inventors: Alan William Somers, Longmont, CO (US); Justin Theodore Gibbs, Boulder, CO (US)

(73) Assignee: Spectra Logic, Corp., Boulder, CO (US)

( * ) Notice: Subject to any disclaimer, the term of this patent is extended or adjusted under 35 U.S.C. 154(b) by 75 days.

(21) Appl. No.: 14/681,862

(22) Filed: Apr. 8, 2015

(65) Prior Publication Data

US 2016/0299709 A1    Oct. 13, 2016

(51) Int. Cl.
G06F 3/06 (2006.01)
G06F 12/08 (2016.01)

(52) U.S. Cl.
CPC ........... *G06F 3/0619* (2013.01); *G06F 3/0616* (2013.01); *G06F 3/0625* (2013.01); *G06F 3/0665* (2013.01); *G06F 3/0689* (2013.01); *G06F 12/0833* (2013.01); *G06F 2212/62* (2013.01)

(58) Field of Classification Search
CPC .... G06F 3/0616; G06F 3/0625; G06F 3/0689; G06F 12/0868; G06F 12/0873
See application file for complete search history.

(56) References Cited

U.S. PATENT DOCUMENTS

| | | | |
|---|---|---|---|
| 7,472,298 B1* | 12/2008 | Kimmel | G06F 1/3203 713/320 |
| 7,734,867 B1* | 6/2010 | Keeton | G06F 3/0625 711/114 |
| 8,868,954 B1* | 10/2014 | Balakrsihnan | G06F 3/0611 711/114 |
| 2008/0007860 A1* | 1/2008 | Miyata | G06F 3/0611 360/69 |
| 2008/0270696 A1* | 10/2008 | Murayama | G06F 1/3221 711/114 |
| 2009/0077300 A1* | 3/2009 | Forbis, III | G06F 3/0613 711/4 |
| 2009/0327599 A1* | 12/2009 | Nonaka | G06F 1/3203 711/112 |
| 2010/0218013 A1* | 8/2010 | Gill | G06F 1/3221 713/320 |
| 2011/0016336 A1* | 1/2011 | Mori | G06F 3/0625 713/320 |

* cited by examiner

*Primary Examiner* — Hal Schnee
(74) *Attorney, Agent, or Firm* — Kenneth Altshuler

(57) ABSTRACT

Apparatus and associated method contemplating: operating a storage server having access to a plurality of storage devices, at least a first storage device of the plurality of storage devices defining a first bank and at least a second storage device of the plurality of storage devices defining a second bank; during a first time interval, energizing the first bank to enable data transfer, and de-energizing the second bank to disable data transfer; during the first time interval, mapping data received from the storage server to the first bank; during a second time interval that begins before a storage capacity of the first bank is full, de-energizing the first bank to disable data transfer, and energizing the second bank to enable data transfer; and during the second time interval, mapping the data received from the storage server to the second bank.

20 Claims, 14 Drawing Sheets

MAPPING OBJECT INTERFACE INTO A POWERED STORAGE DEVICE SYSTEM

CROSS-REFERENCE TO RELATED APPLICATIONS

None.

BACKGROUND OF THE INVENTION

1. Field of the Invention

The present embodiments relate generally to interfacing object storage into a storage system that selectively manages a power distribution to extend the longevity of the storage system.

2. Description of Related Art

Information and management computer applications are used extensively to track and manage data relevant to an enterprise, such as marketing and sales data, manufacturing data, inventory data, and the like. Typically, the application data resides in a centralized database within a distributed storage system. Local applications integrate remote clients and network servers to use and manage the application data, and to make the application data available to remote applications such as via remote procedure calls (RPCs).

The centralized location of the application data can be problematic in that it places on the enterprise owner the onus of maintaining complex computer systems in order to support the applications. For example, it has traditionally been necessary for the enterprise owner to acquire the knowledge necessary to purchase and maintain the physical storage devices that store the data. To avoid running out of storage space, typically more space is acquired than is actually needed. To avoid losing important data, typically more data is retained than is actually needed. These pitfalls can spiral out of control, resulting in a lack of storage space becoming an emergency or important data being lost or corrupted.

The enterprise owner also disadvantageously has the responsibility for the many administrative details required for efficient and effective data management, such as managing individual utilizations of the physical data storage devices in view of the expected longevities of the data storage devices.

This has caused a proliferation in cloud-based service providers offering remote storage and maintenance of the application data, shifting the need for expertise from the enterprise owner to information technology experts. That advantageously enables the enterprise owner to pay for only the amount of storage space actually used because the charges can be provisioned as the amount of storage changes. Further, shifting the administrative tasks to a contracted service provider frees up the enterprise owner to focus on its core business concerns.

With the shift toward cloud-based storage of enterprise data, improvements are needed that interface remote object storage activities into storage device systems that manage power distributions in order to significantly increase the expected longevity of the backend storage system. It is to a solution for that need that the embodiments of the present technology are directed.

SUMMARY OF THE INVENTION

Some embodiments of the claimed technology contemplate a method that includes: operating a storage controller having data storage access to each of a plurality of storage devices grouped into a first bank of storage devices and a second bank of different storage devices, and the storage controller caching application data from a host pending transfer to at least one of the banks of storage devices; during a first time interval, energizing the first bank of storage devices to enable data transfer, and de-energizing the second bank of storage devices to disable data transfer; during the first time interval, mapping the cached application data to the first bank of storage devices; during a second time interval that begins before the storage capacity of the first bank of storage devices is full, de-energizing the first bank of storage devices to disable data transfer, and energizing the second bank of storage devices to enable data transfer; and during the second time interval, mapping the cached data to the second bank of storage devices.

Some embodiments of the claimed technology contemplate an apparatus having a plurality of storage devices, at least a first storage device of the plurality of storage devices defining a first bank and at least a second storage device of the plurality of storage devices defining a second bank. A data cache operably contains cache data received from a host pending transfer to the banks. A power manager module includes computer instructions stored in a computer memory and configured to be executed by a computer processor to selectively energize the banks to enable data transfer and to de-energize the banks to disable data transfer in accordance with a longevity power profile, the longevity power profile during a first time interval causing the first bank to be energized and the second bank to be de-energized and during a subsequent, second time interval causing the second bank to be energized and the first bank to be de-energized, the second interval beginning before a storage capacity of the first bank is full. A data transfer controller module includes computer instructions stored in computer memory and configured to be executed by computer processor to map first cached data to the first bank during the first time interval and to map second cached data to the second bank during the second time interval.

Some embodiments of the claimed technology contemplate a method including: operating a storage server having access to a plurality of storage devices, at least a first storage device of the plurality of storage devices defining a first bank and at least a second storage device of the plurality of storage devices defining a second bank; during a first time interval, energizing the first bank to enable data transfer, and de-energizing the second bank to disable data transfer; during the first time interval, mapping data received from the storage server to the first bank; during a second time interval that begins before a storage capacity of the first bank is full, de-energizing the first bank to disable data transfer, and energizing the second bank to enable data transfer; and during the second time interval, mapping the data received from the storage server to the second bank.

DETAILED DESCRIPTION

Initially, it is to be appreciated that this disclosure is by way of example only, not by limitation. The power management concepts herein are not limited to use or application with any specific system or method. Thus, although the instrumentalities described herein are for the convenience of explanation, shown and described with respect to exemplary embodiments, it will be appreciated that the principles herein may be applied equally in other types of systems and methods involving interfacing object storage with a selectively powered storage device system.

Figure 1:
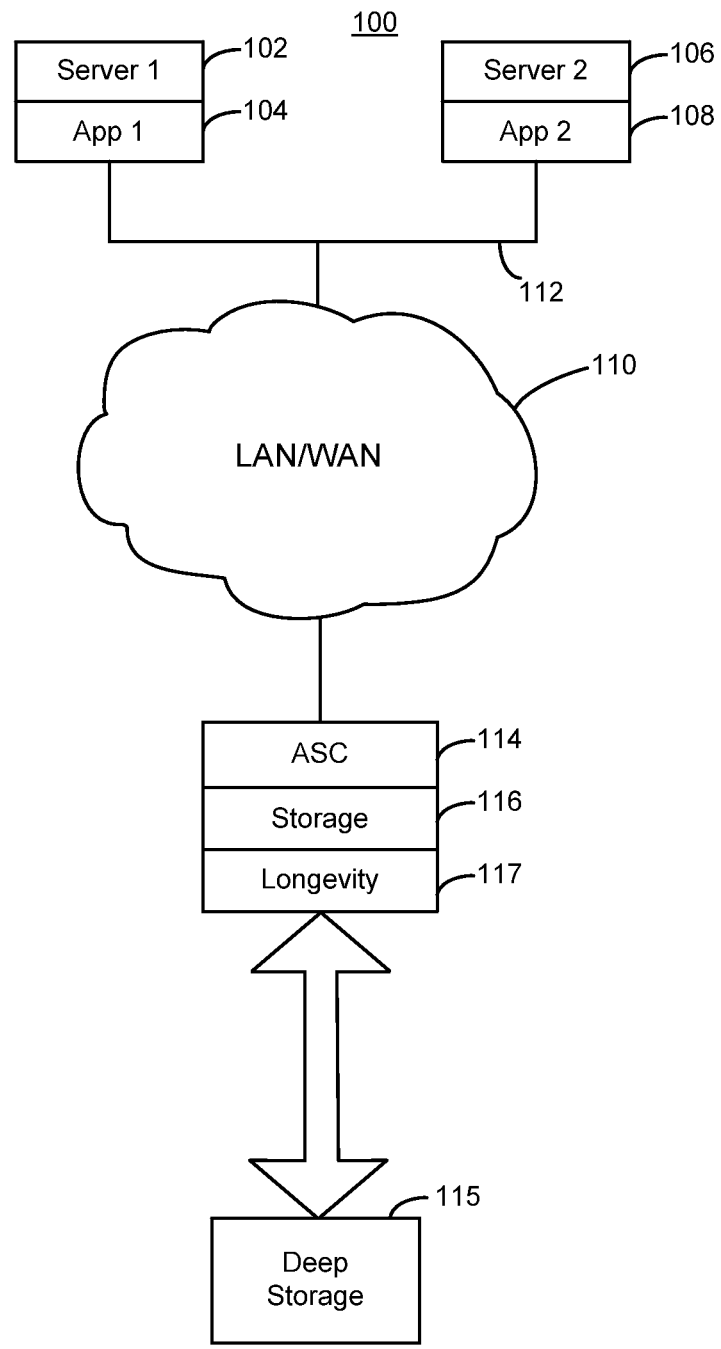
FIG. 1 is a simplified block depiction of a network storage system constructed in accordance with illustrative embodiments of the present technology.

To illustrate an exemplary environment in which preferred embodiments of the present technology can be advantageously practiced, FIG. 1 is a simplified depiction of a distributed storage system 100 that includes a first server 102 executing a first application (APP1) 104, and a second server 106 executing a second application (APP2) 108. The servers 102, 104 are sometimes referred to herein a "clients" in equivalent embodiments. The circuitries represented by the block depiction in FIG. 1 and otherwise throughout this description generally can be embodied in a single integrated circuit or can be distributed among a number of discrete circuits as desired.

A detailed description of the computer applications APP1, APP2 is unnecessary for the skilled artisan to understand the scope of the claimed technology. Generally, APP1 and APP2 can be any type of computer application such as but not limited to a point of sale application, an inventory application, a supply-chain application, a manufacturing application, and the like. The servers 102, 106 can communicate with each other via a communications link 112, such as a local area network (LAN). Although not depicted, in alternative embodiments the servers 102, 106 can be remotely located from each other and communicate individually via a wide area network 110, such as the Internet. In any event, the servers 102, 106 transfer application data to and retrieve application data from the network 110 in the normal course of executing the respective applications APP1, APP2.

An archive storage controller (ASC) 114 stores backup copies (backups) of the application data to an internal storage array 116. In this technology the ASC 114 includes longevity management logic ("LML") 117 designed to extend the longevity of the storage devices collectively forming the internal storage array 116. In various embodiments not discussed in detail the ASC 114 can subsequently provision the backups to a backend deep storage system 115, such as to a tape library in these illustrative embodiments.

Although not depicted in FIG. 1, it will be understood that backup logic resides within the storage system 100 to provide top level control of what backups of the application data are obtained, and how long the backups are retained. To that end, the backup logic enforces policy rules that are established by an administrator (a skilled information technology person managing the storage system 100). The administrator can control parametric inputs that define the backup policy rules. Although in the illustrative embodiments of this description the backup policy rules are the same for both the APP1 data and the APP2 data, in alternative embodiments the APP1 data and the APP2 data can have different, individual backup policy rules. The backup logic can include snapshot rules (an entire copy of stored data), incremental update rules (changes in the stored data between successive snapshots), thinning rules (retention of archived data), and the like. A detailed discussion of employing any particular backup logic is not necessary for the skilled artisan to understand the scope of the claimed subject matter.

The ASC 114 can provide a cloud-computing interface for migrating the backups from the servers 102, 106 to the ASC 114. For example, a client application in each server 102, 106, or in some other network device, can send data via the network 110 by implementation of representational state transfer (REST) calls from the client application. That is, the client application can send and receive data via connection with the ASC 114 configured as a native hypertext transfer protocol (HTTP) device. The client connection with the ASC 114 is built into the client application so that both sending data to and receiving data from the ASC 114 is self-contained and automatically established by the client application when necessary. Generally, the client application maps requests/responses to REST request/response streams to carry out predetermined transfers of data.

Figure 2:
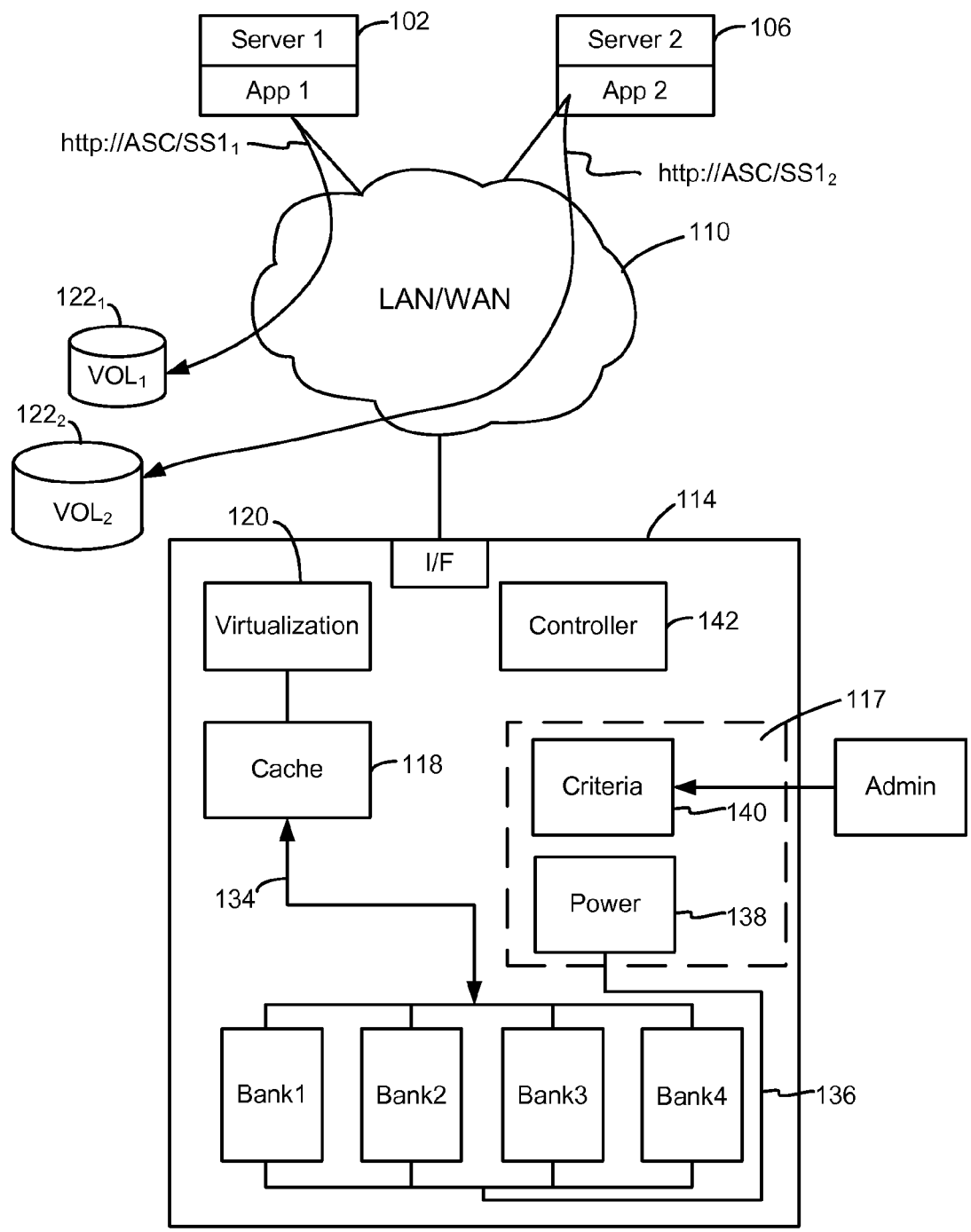
FIG. 2 is a simplified block depiction of the remote clients creating logical volumes (containers) in the archive storage controller for APP1 and APP2 backups.
Figure 3:
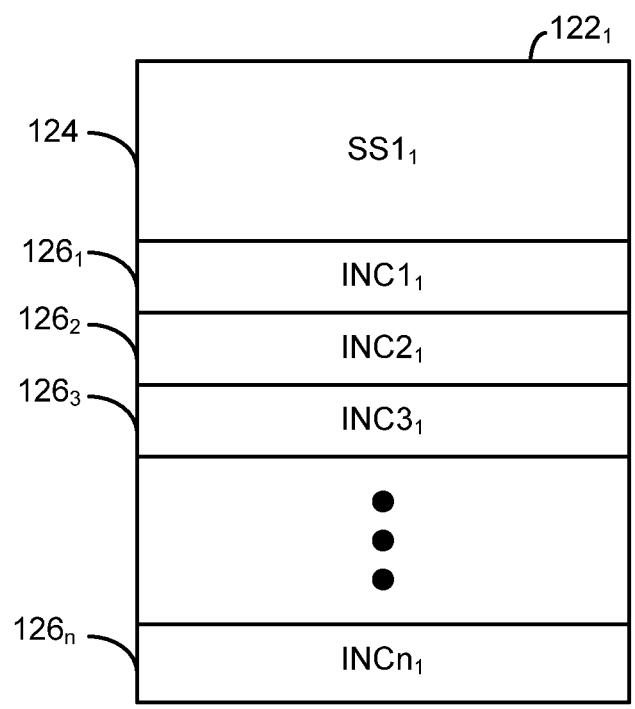
FIG. 3 is a diagrammatic depiction of contents of the logical volume for APP1.

Turning to FIG. 2, the client applications logically organize the backups in a cache memory (or "cache") 118 residing in the ASC 114. A virtualization module 120 creates a logical storage hierarchy in terms referred to herein as creating a "logical container," or more generally creating a "container" 122 for the backups in the cache 118. Each container 122 and its contents can be identified by strategic use of addressable HTTP uniform resource identifiers (URIs). For this example, it is presumed that first snapshot ("SS") copies are obtained for the applications APP1, APP2 in accordance with the backup logic. The backup logic migrates the APP1 first snapshot ("SS1") copy to a newly created container $122_1$ by the PUT request https://ASC.APP1.SS1. FIG. 3 depicts the container $122_1$ contains that first snapshot labeled in terms of its sequential snapshot number and application number, "SS1$_1$" (meaning the first snapshot copy for application APP1), for this example. FIG. 3 depicts a subsequent point in time when the contents of the container 122$_1$ include the first snapshot SS1$_1$ in the root directory 124 of the container 122$_1$, and a number of incremental updates INC1$_1$, INC2$_1$ . . . INCn$_1$ in respective subdirectories 126 of the container 122$_1$.

Returning to FIG. 2, the backup logic migrates the first APP2 snapshot to a newly created container 122$_2$ by the PUT request https://ASC.APP2.SS1, and so labeled SS1$_2$ (meaning the first snapshot copy for application APP2) for this example. For purposes of this description the term "migrate" means that each backup is transferred to the ASC 114 without leaving a copy remaining at the source. Alternatively, the backups can be copied to the ASC 114 while leaving a redundant copy residing at the source.

The cache 118 in these illustrative embodiments is only a temporary repository for the backups. Eventually, the ASC 114 flushes the cached backups to prevent saturation of the cache 118. Preferably, the backup logic only controls so far as migrating the backups to the containers 122. That is, the backup logic is unaware of and has no control of what happens to the backups after they are migrated to the containers 122. Post-container 122 control is preferably performed by the ASC 114, with no communication between the server 102, 106 or the backup logic and the ASC 114 via the network 110. In alternative embodiments the backups can be transferred directly to the long term data storage without the caching.

Figure 4:
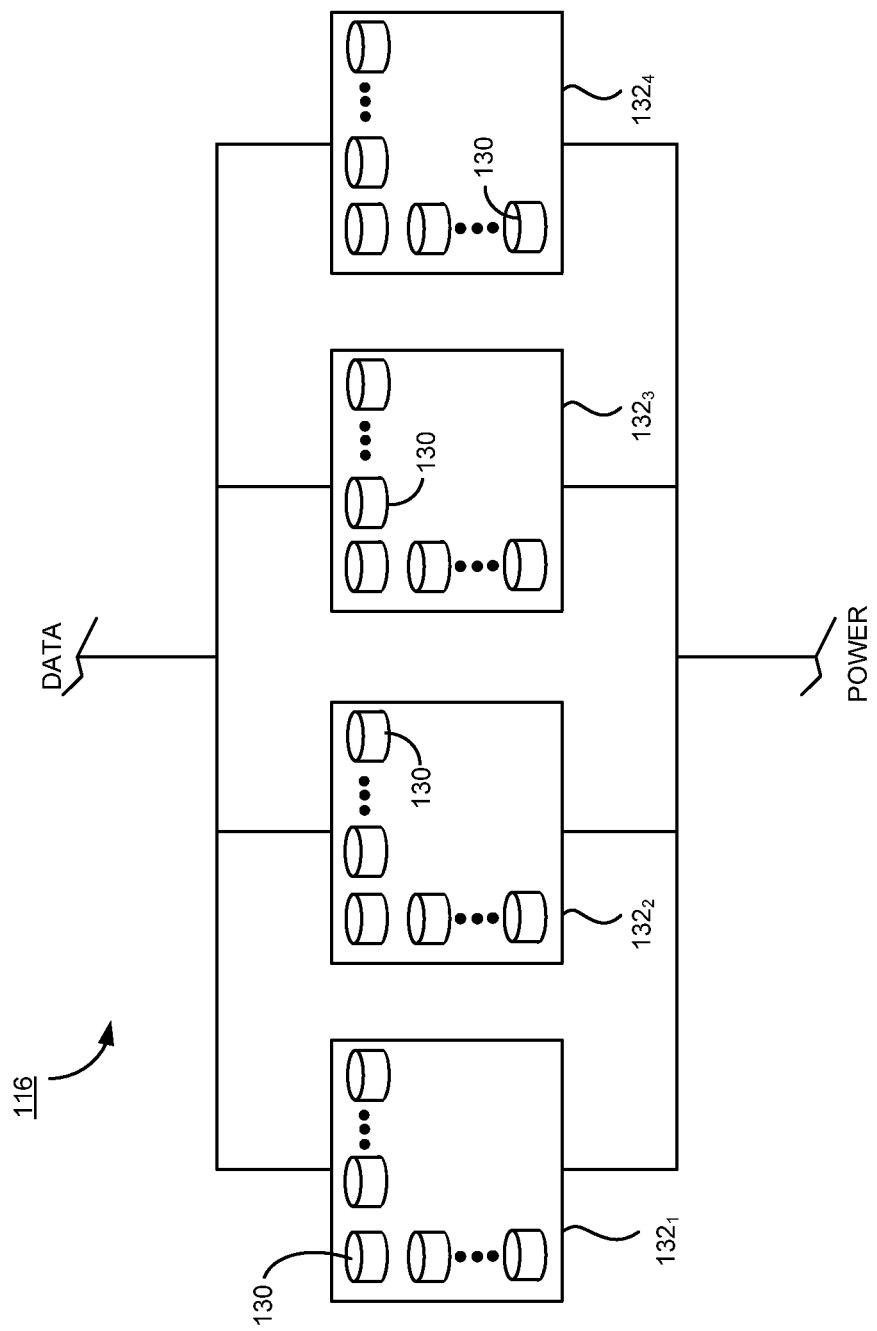
FIG. 4 diagrammatically depicts the archive storage controller (ASC) of FIG. 1 having a number of banks of storage devices.

FIG. 4 diagrammatically depicts the storage array 116 in accordance with illustrative embodiments. The array 116 is formed by a plurality of data storage devices 130 grouped into four banks 132$_i$ for purposes of these illustrative embodiments. The ASC 114 via its cache 118 has data storage access to each of the banks 132 collectively, and to each of the storage devices 130 within each bank 132 individually, via a network link 134.

To make the storage devices 130 operational for transferring data, in these illustrative embodiments the banks 132 can be individually energized via an electrical link 136. Energizing a bank 132, for purposes of this disclosure means making the storage devices 130 within the bank 132 capable of transferring data with the ASC 114 via the network link 134. Each of the banks 132 is selectively energized by a power manager 138 (FIG. 2), which in these illustrative embodiments resides in the ASC 114.

Although in the illustrative embodiments that follow an entire bank 132 is either energized or de-energized, the contemplated embodiments are not so limited. In alternative embodiments the skilled artisan will understand that subgroups of the storage devices 130 within a bank 132 can be selectively energized in the same way, or even each of the storage devices 130 within a bank 132 can be individually energized, within the contemplated meaning of the claimed invention.

It will also be noted that FIG. 4 depicts each of the banks 132 has an undefined number of storage devices 130. The number of storage devices 130 only relates to the total amount of storage capacity in each bank 132, such that the skilled artisan needs no explanation of any particular number of storage devices 130 forming each bank 132, or the shape of the array forming each bank 132. In successful reductions to practice a total of ninety-six (96) one-terabyte disk drives were employed. Four (4) of those disk drives were allocated as spares for use in any of the banks 132, leaving the remaining disk drives grouped into four banks 132$_1$, 132$_2$, 132$_3$, 132$_4$ of twenty-three (23) disk drives each.

Although in the illustrative embodiments that follow each of the banks 132 has the same number of disk drives 130, the contemplated claimed invention is not so limited.

With reference to FIGS. 2 and 4, in the following description the power manager 138 selectively energizes one or more of the banks 132 according to predetermined criteria 140. In these illustrative embodiments the LML 117 includes both the criteria module 140 and the power manager module 138. The storage controller 142 maps data residing in the cache 118 to the one or more banks 132 that are energized at the time, and transfers the cached data accordingly. A detailed discussion of how the data is stored in each bank 132 is not necessary for the skilled artisan to understand the subject matter and scope of the claimed invention. That is, for example, the skilled artisan knows the data can be striped across multiple disk drives 130 to increase the write throughput capability by simultaneously writing buffered data to multiple disk drives. Preferably, the data can be stored redundantly (a RAID format) to provide the opportunity for recovery of corrupted data.

Figure 5:
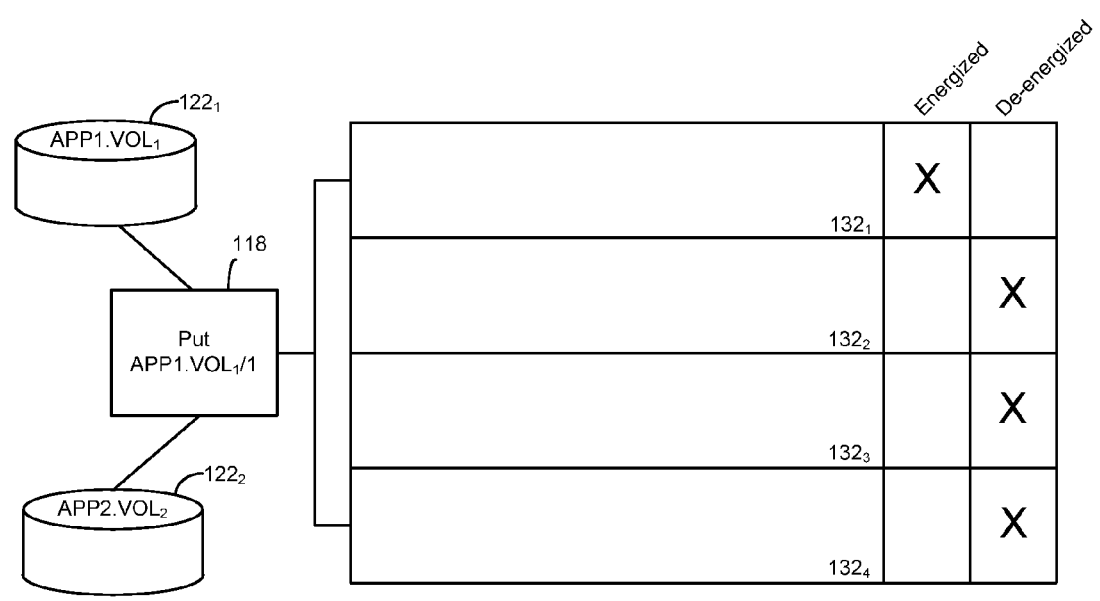
FIG. 5 is a diagrammatic depiction of the archive storage controller buffering a chunk of the APP1 data at a time when only the first bank is enabled.

FIG. 5 diagrammatically depicts data from both containers 122$_1$ (VOL$_1$), 122$_2$ (VOL$_2$) being temporarily stored in the cache 118 before ultimately being stored in the banks 132. The data is cached until a particular size chunk of data is accumulated for one of the containers VOL$_1$, VOL$_2$. The chunk size can be determined by the criteria 140, and can vary in response to network load in order to prevent saturating the cache 118.

FIG. 5 depicts the point-in-time when the controller 142 (FIG. 2) has polled the cache 118 and determined there is a first (for purposes of this example only) chunk of VOL$_1$ data (denoted "VOL$_1$/1") ready to flush. The VOL$_1$/1 chunk can be snapshot data, incremental data, thinning data, redundancy data, or a mixture. At that point-in-time the controller 142 recognizes that the LML 117 has energized only the first bank 132$_1$. In this technology, the LML 117 controls which bank(s) is energized at any given point-in-time, and the controller 142 adapts flushing the cache 118 to the LML 117 control of power for the purposes of extending the longevity of the storage devices forming the banks 132. In this particular example, the controller 142 maps the VOL$_1$/1 chunk to the first bank 132$_1$ and flushes the cache 118.

Figure 6:
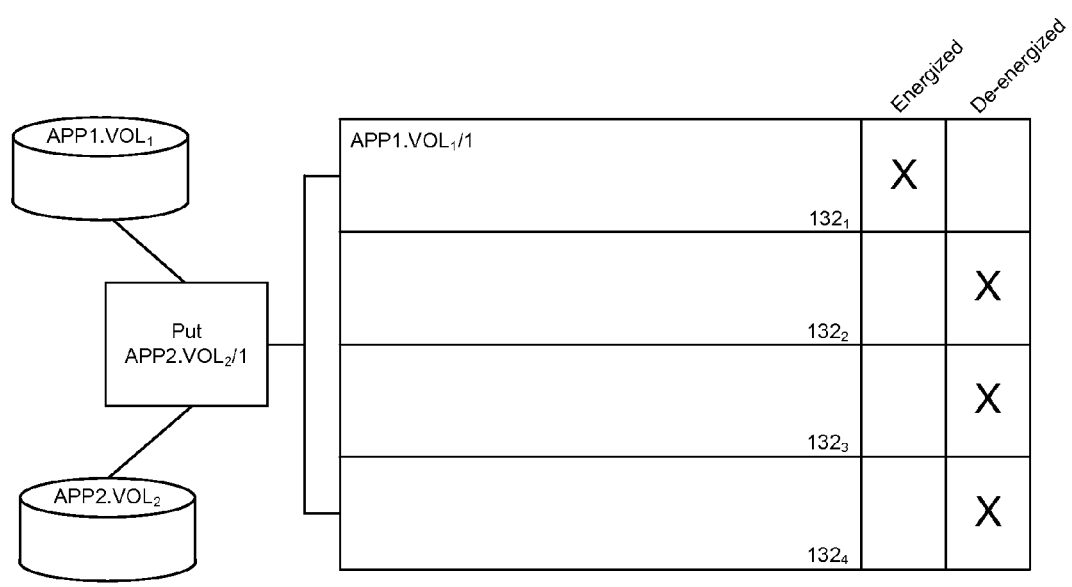
FIG. 6 is a diagrammatic depiction of the archive storage controller having stored the buffered chunk in FIG. 5 to the first bank and buffering another chunk of the APP2 data during the time that only the first bank is energized.

FIG. 6 is similar to FIG. 5, but depicting a subsequent point-in-time after the controller 142 has flushed the VOL$_1$/1 chunk to the first bank 132$_1$. At this subsequent point-in-time the controller 142 has polled the cache 118 and determined there is a first (for purposes of this example) chunk of the VOL$_2$ data (denoted "VOL$_2$/1") ready for flushing. At this subsequent point-in-time the controller 142 observes that only the first bank 132$_1$ is energized, so the controller 142 maps the Vol$_2$/1 chunk to the first bank 132$_1$ and flushes the cache 118.

Figure 7:
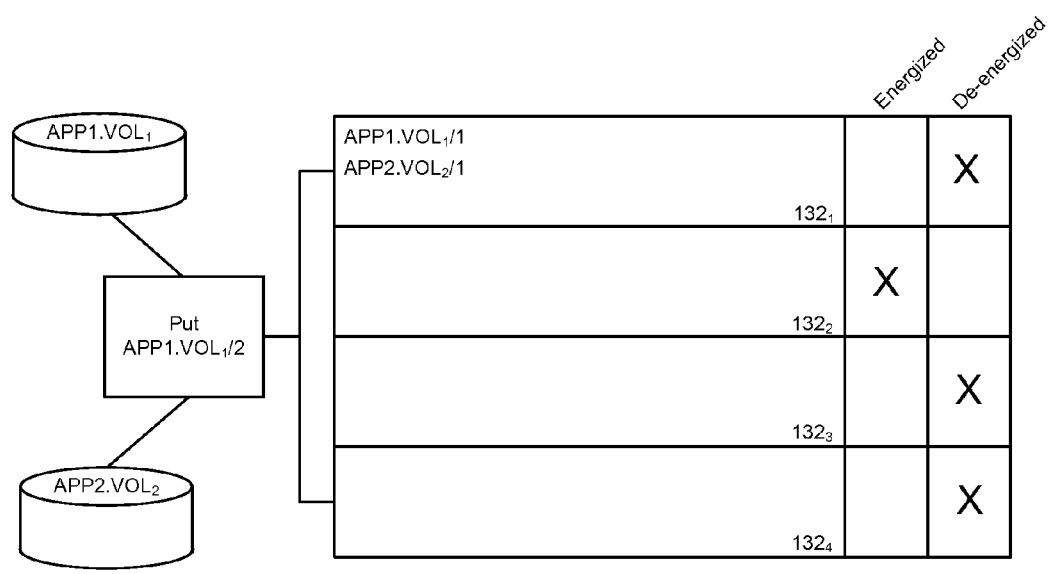
FIG. 7 is a diagrammatic depiction of the archive storage controller having stored the buffered chunk in FIG. 6 to the first bank and buffering a second chunk of the APP1 data during a time when only the second bank is enabled.

FIG. 7 depicts what has been discussed so far, the controller 142 having flushed both chunks Vol$_1$/1 and Vol$_2$/1 to the first bank 132$_1$. However, at the subsequent point-in-time depicted in FIG. 7, the LML 117 has de-energized the first bank 132$_1$ and energized the second bank 132$_2$. De-energizing the first bank at the same time as energizing the second bank can be advantageous for minimizing the power budget, although the contemplated embodiments are no required. In alternative embodiments the timing of the de-energizing can be subject to system level administration which can prioritize background operations that are completed before the first bank can be de-energized The LML 117 (according to its criteria 140) continually cycles the energization duty cycle among the banks 132 in an intentional effort to maximize longevity of the storage array 116 as a whole by equalizing the utilization of all the individual banks 132. For example, energizing only one bank 132 at a time as depicted provides ample storage capacity for the present I/O activity while permitting 75% of the disk drives to be de-energized. The intermittent, reduced run times and the concomitant reduced heat generation are factors that increase the longevity of the storage array 116 as a whole. The criteria 140 (FIG. 2) can be programmed to continually aim to equalize the utilizations of each bank 132.

The utilizations can be very generally approximated in terms of time energized. For example, in simple embodiments the LML 117 can energize each of the banks 132 for a predetermined interval of time, such as for one hour each. However, it has been determined that a more meaningful utilization is tied to actual usage of the storage devices because an interval of time, in and of itself, does not account for variations in the network load of I/O activity. Thus, the LML 117 can be programmed to switch energization from one bank 132 to another after satisfying a set threshold number of REST calls, or a number of seeks by a disk drive, and the like. The threshold can be a predetermined constant or it can be varied based on network load, feedback from preventive maintenance routines, and the like.

Figure 8:
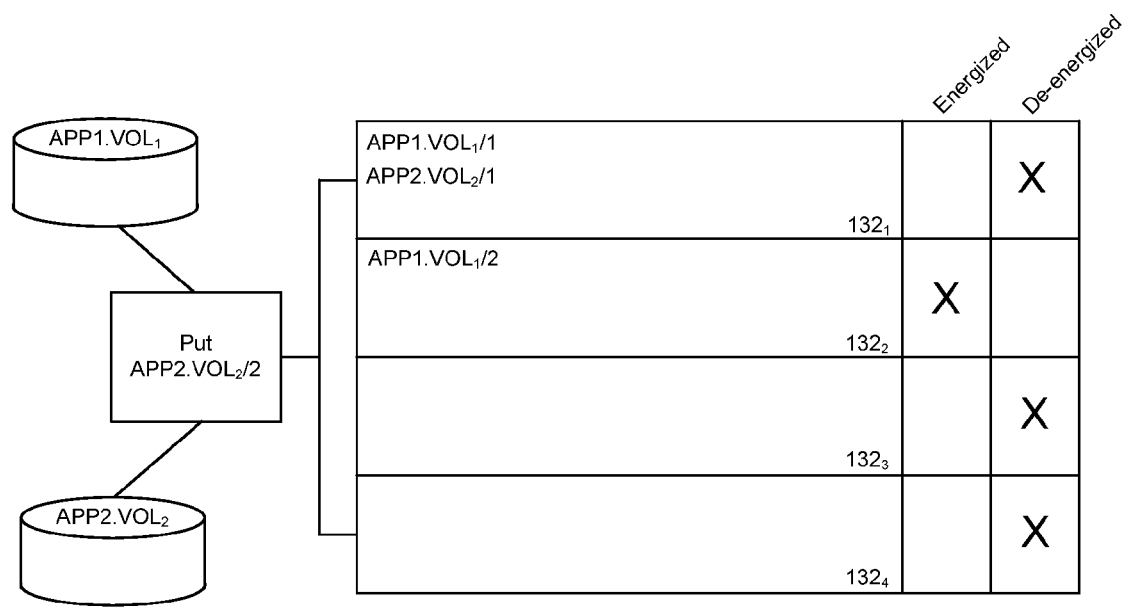
FIG. 8 is a diagrammatic depiction of the archive storage controller having stored the buffered chunk of FIG. 7 in the second bank and subsequently buffering a second chunk of the APP2 data during the time when only the second bank is energized.
Figure 9:
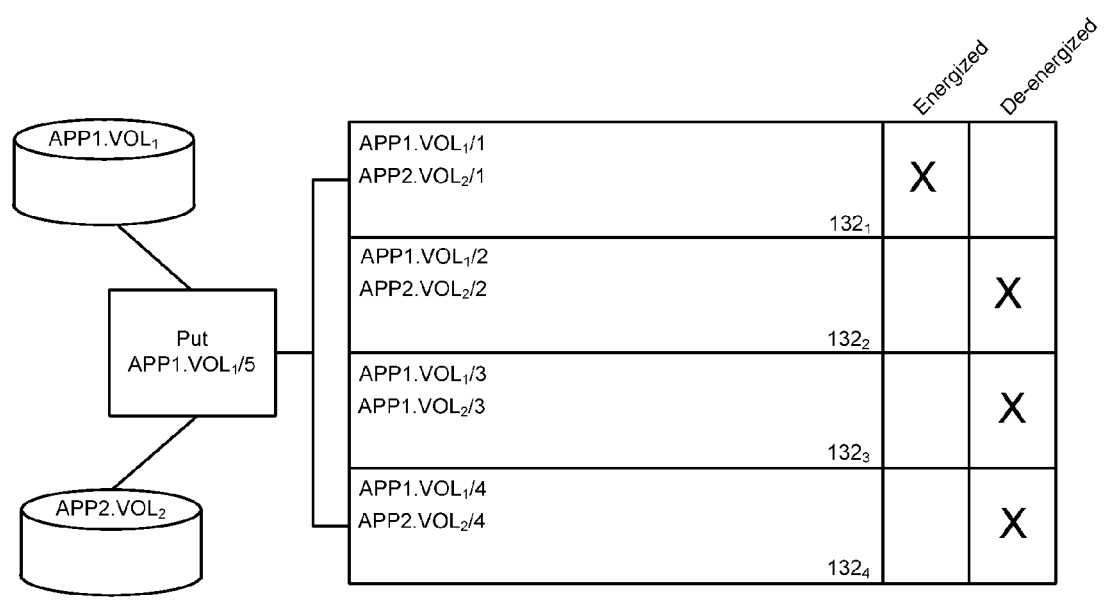
FIG. 9 is a diagrammatic depiction of the archive storage controller at a subsequent time after it has stored APP1 and APP2 data to all of the banks, and presently buffering a fifth chunk of the APP1 data during a time when only the first bank is energized.

FIG. 8 depicts a subsequent point-in-time while the LML 117 is still energizing the second bank $132_2$, and the controller 142 has identified a second $VOL_2$ chunk (denoted "$VOL_2/2$") in the cache 118 that is ready for flushing. The controller 142 maps the $VOL_2/2$ data to the second bank $132_2$ and flushes the data there. FIG. 9 depicts a subsequent point-in-time after this procedure has continued throughout the energizations of the other banks $132_3$, $132_4$, until the cycle starts over with again energizing the first bank $132_1$ at a time when the controller has identified a fifth $VOL_1$ chunk (denoted "$VOL_1/5$") in the cache 118 that is ready for flushing.

Figure 10:
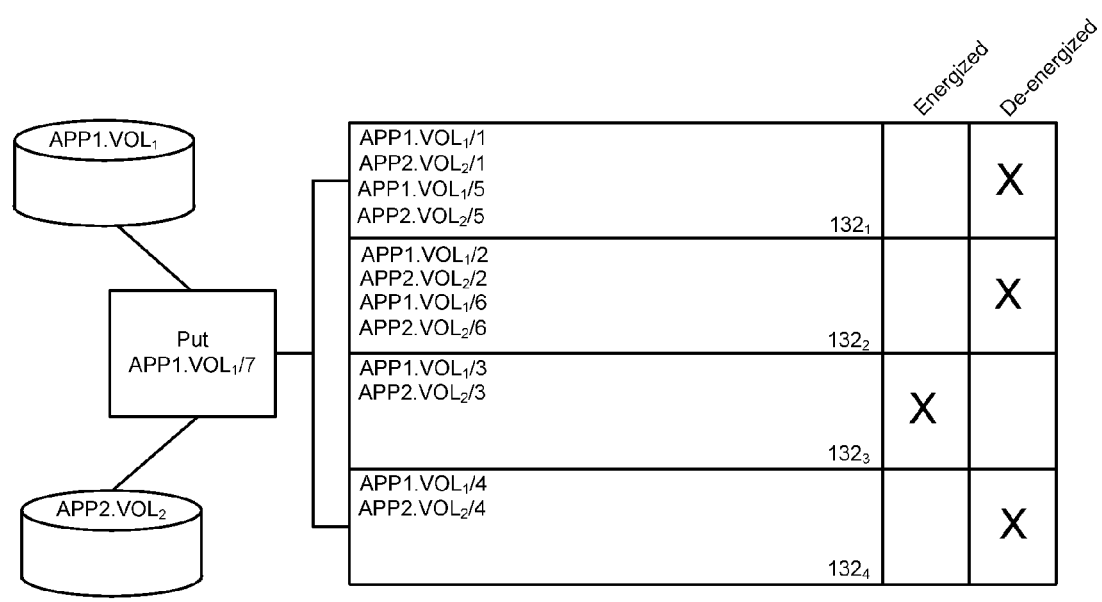
FIG. 10 is a diagrammatic depiction of the archive storage controller buffering a seventh chunk of APP1 data during a time when only the third bank is energized.
Figure 11:
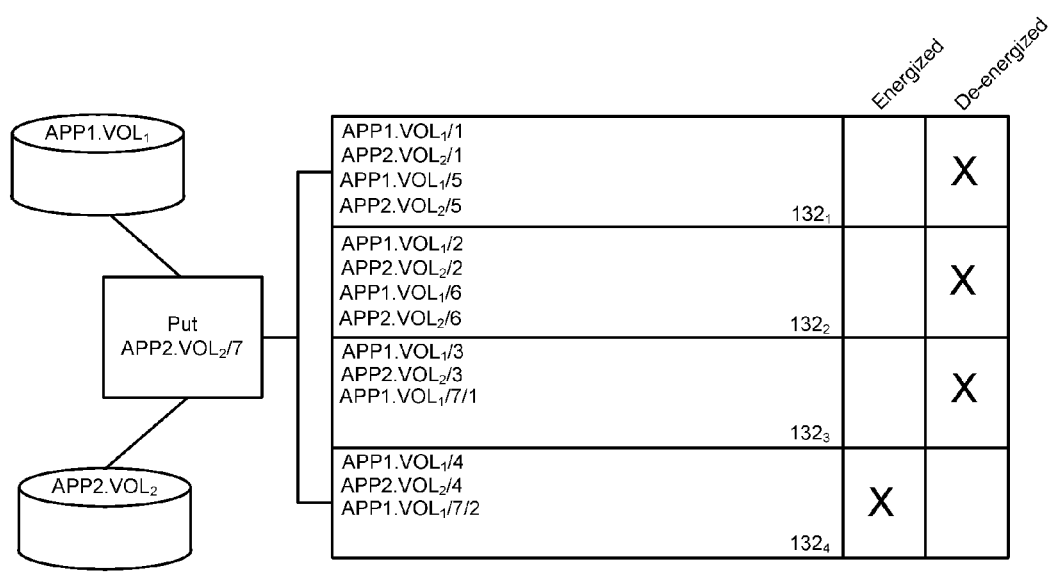
FIG. 11 is a diagrammatic depiction of the archive storage controller mapping the buffered chunk of FIG. 10 in the third and fourth banks.

FIG. 10 depicts yet another subsequent point-in-time when this procedure has continued until the LML 117 has switched energization to the third bank $132_3$, and the controller 142 has identified a seventh $VOL_1$ chunk (denoted "$VOL_1/7$") in the cache 118 that is ready for flushing. FIG. 11 depicts the controller 142 has split the $VOL_1/7$ chunk into a first portion $VOL_1/7/1$ that is mapped to the third bank $132_3$ and a second portion $VOL_1/7/2$ that is mapped to the fourth bank $132_4$. In these embodiments the LML 117 called for switching energization from the third bank $132_3$ to the fourth bank $132_4$ during the time that the controller 142 was flushing the $VOL_1/7$ chunk from the cache 118. The controller 142 adapted by splitting the $VOL_1/7$ chunk in these embodiments where the LML 117 maintains rigid control of the timing of the energization switchings. Alternatively, the LML 117 can be programmed to operate with a margin that permits a completion of any current flushing activity before switching energization from or to a bank affected by the flushing activity.

Figure 12:
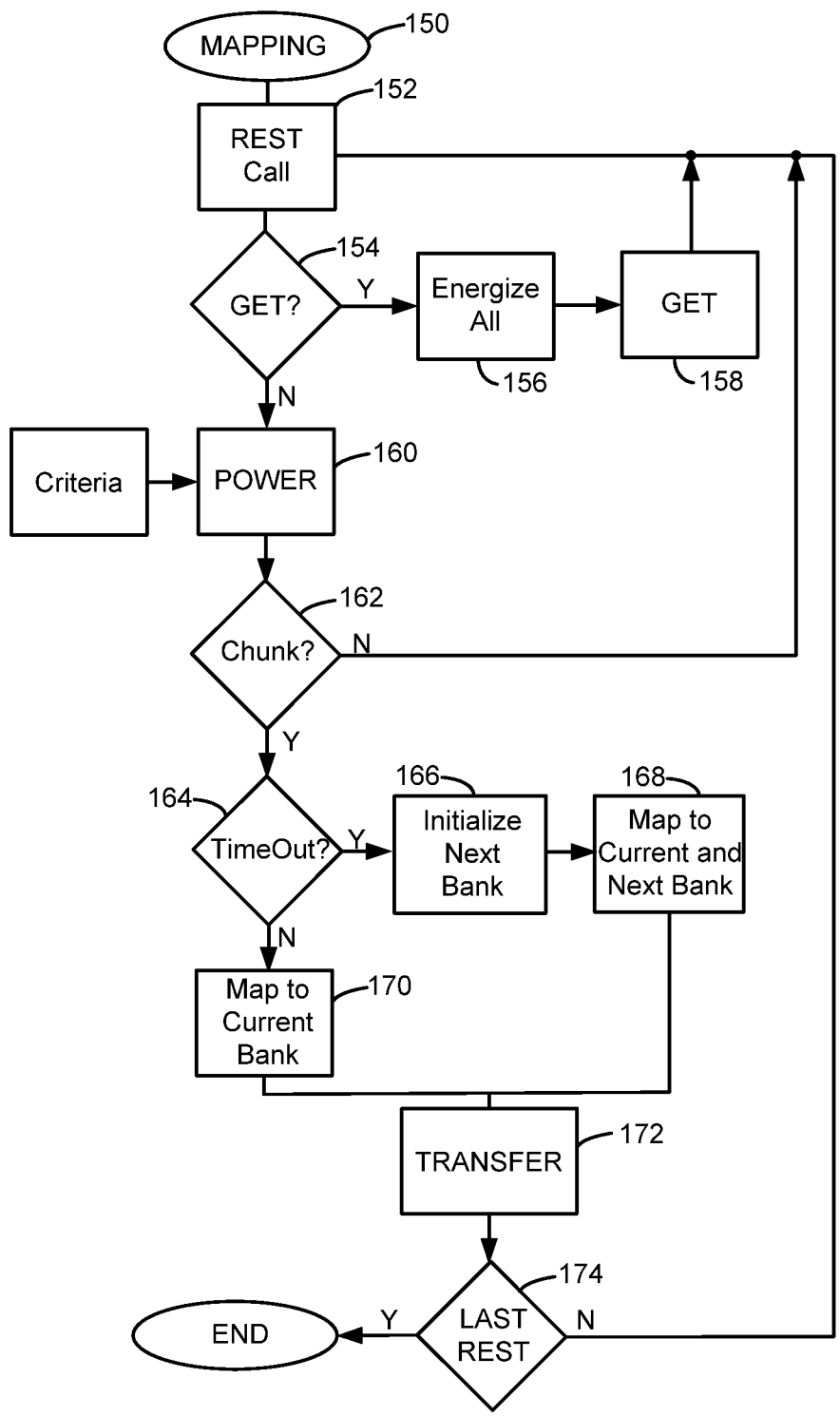
FIG. 12 is a flowchart of steps in a method for MAPPING in accordance with illustrative embodiments of the present technology.

FIG. 12 is a flowchart depicting steps in a method 150 for MAPPING OBJECTS into a powered storage device system that is performed in accordance with embodiments of this technology. The method 150 begins in block 152 with processing the next REST call from a server (such as 102, 106). In block 154 it is determined whether the request is a GET request. If the determination of block 154 is "yes," then control passes to block 156 where all of the banks (such as 132) that contain requested data are energized.

Figure 13:
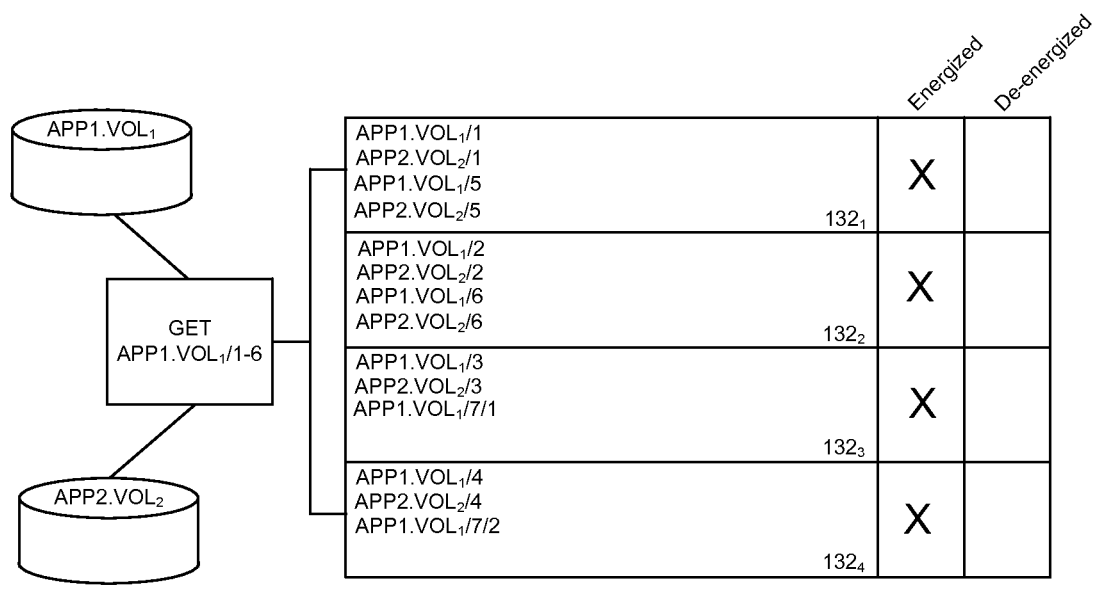
FIG. 13 is a diagrammatic depiction of the archive storage controller simultaneously energizing all of the banks in response to a GET request for APP1 data.

FIG. 13 depicts an example of this case where the ASC 114 has received a GET request for the first six chunks of the $VOL_1$ data ($VOL_7/1$-6). The LML 117 determines that some portion of that request is stored in each of the banks $132_1$, $132_2$, $132_3$, $132_4$. In some embodiments, as depicted, the LML 117 simultaneously energizes all four banks $132_1$, $132_2$, $132_3$, $132_4$ so that portions of the requested data can be simultaneously transferred by parallel streams. That provides for the quickest response to the GET request. Alternatively, the LML 117 can sequentially transfer portions of the requested data from each bank 132, staging the energization of a next bank $132_j$ to occur in conjunction with having transferred the requested portion of the request from a previous bank $132_i$.

Returning to FIG. 12, in block 158 the controller (such as 142) transfers the data to satisfy the GET request in accordance with the power manager's (such as 117) provision of energizing the banks (such as 132). That is, the GET request is satisfied by transferring the requested data from all the pertinent banks (such as 132) either simultaneously, sequentially, or a blend of both simultaneously and sequentially. Control then passes back to block 152 to process the next REST call.

If, on the other hand, the determination of block 154 is "no," then in block 160 the controller (such as 142) ascertains the present status of energizing the banks (such as 132). This informs the controller (such as 142) as to which bank(s) any available chunk can presently be mapped to the storage system (such as 116). In block 162 the controller (such as 142) determines whether a chunk is available in cache (such as 118) for flushing. If the determination of block 162 is "no," then control returns to block 152 for processing the next REST call.

If, on the other hand, the determination of block 162 is "yes," then in block 164 the controller (such as 142) determines whether the energization is scheduled to change before the chunk identified in block 162 can be flushed from the cache (such as 118). This is depicted in FIG. 12 as the occurrence of a "timeout" prior to completion of the flushing. If the determination of block 164 is "yes," then in block 166 the power manager (such as 117) initializes the next bank (such as $132_i$) and in block 168 the controller (such as 142) maps the chunk identified in block 162 to both the current and next banks (such as $132_{i,j}$). If, on the other hand, the determination of block 164 is "no," then in block 170 the controller (such as 142) maps the chunk identified in block 162 to the current bank (such as $132_i$). In either case, control then passes to block 172 where the controller (such as 142) transfers the chunk to its mapped destination in the storage array 116. If block 174 determines that the last REST call has been processed, then the method ends; else, control returns to block 152 to process the next REST call.

Figure 14:
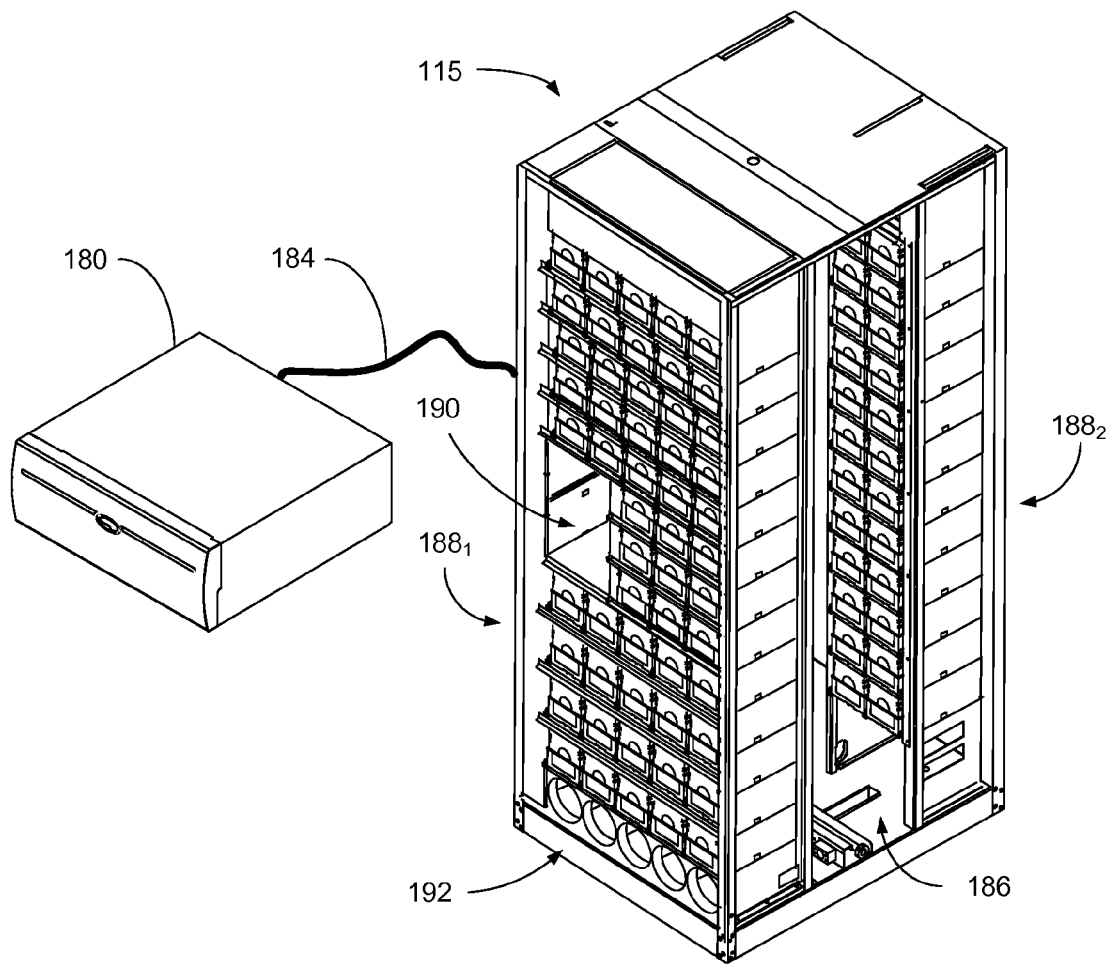
FIG. 14 is an isometric depiction of the ASC of FIG. 1 connected to a tape library for deep backend storage.

Embodiments of the present invention can be commercially practiced in a Black Pearl archive storage system connected to a Spectra Logic T-Finity tape cartridge library on the backend manufactured by Spectra Logic of Boulder, Colo. FIG. 14 shows a commercial embodiment of a Black Pearl archive storage system 180 communicatively linked with the T-Finity unit 115 (see FIG. 1) via a cable 184. The T-Finity unit 115 is depicted without an enclosure. The T-Finity unit 115 as depicted is a single cabinet, but in alternative embodiments multiple cabinets can be combined as necessary to make an expanded tape library or to expand an existing tape library. The Black Pearl archive storage system 180 has an ASC as described herein (not depicted), a plurality of data storage drives (not shown), and software that facilitates receiving data from a server (not shown), caching that data in at least one of the plurality of data storage drives, and storing that data to tape cartridges in the T-Finity library 115. The Black Pearl archive storage system 180 is capable of handling all tape related storage commands without the server's involvement. The T-Finity unit 115 has a first and second shelf system 188₁, 188₂ that are adapted to support a plurality of the removable storage devices, such as tape cartridge magazines in these illustrative embodiments. The second shelf system 188₂ has at least one tape drive (not depicted) adapted to read and write data to and from a tape cartridge. Functionally interposed between the first and second shelf system 188₁, 188₂ is a magazine transport space 186. The magazine transport space 186 provides adequate space for a tape cartridge magazine (not depicted) to be moved, via a magazine transport (not depicted), from a position in the shelf system 188₁, 188₂ to a tape drive (not depicted). Tape cartridge magazines can be transferred into and out from the T-Finity library via an entry/exit port 190. The T-Finity tape library 115 includes a means for cooling as shown by the fans 192 located at the base.

It is to be understood that even though numerous characteristics and advantages of various embodiments of the present technology have been set forth in the foregoing description, together with the details of the structure and function of various embodiments of the invention, this disclosure is illustrative only, and changes may be made in detail, especially in matters of structure and arrangement of parts within the principles of the present technology to the full extent indicated by the broad general meaning of the terms in which the appended claims are expressed. For example, in alternative equivalent embodiments the REST calls can be associated with some purpose other than archiving backups as in the disclosed illustrative embodiments, while still maintaining substantially the same functionality without departing from the scope and spirit of the claimed invention. Another example can include using these techniques across multiple library partitions, while still maintaining substantially the same functionality without departing from the scope and spirit of the claimed invention. Further, though communication is described herein as between a server and a tape library, communication can be received directly by a tape drive, for example, without departing from the scope and spirit of the claimed invention. Further, for purposes of illustration, the tape drive and tape cartridges are used herein to simplify the description for a plurality of tape drives and tape cartridges. Finally, although the preferred embodiments described herein are directed to tape drive systems, and related technology, it will be appreciated by those skilled in the art that the claimed technology can be applied to other systems, without departing from the spirit and scope of the present technology.

It will be clear that the claimed technology is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed technology disclosed and as defined in the appended claims.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed is:

1. A method comprising:
   operating a storage controller having data storage access to each of a plurality of storage devices grouped into a first bank of storage devices and a second bank of different storage devices, and the storage controller caching application data from a host pending transfer to at least one of the banks of storage devices;
   during a first time interval, energizing the first bank of storage devices to enable data transfer;
   during the first time interval, mapping the cached application data to the first bank of storage devices;
   during a second time interval that begins before a storage capacity of the first bank of storage devices is full and in response to longevity management logic configured to equalize utilizations of the banks, energizing the second bank of storage devices to enable data transfer; and
   during the second time interval, mapping the cached data to the second bank of storage devices.

2. The method of claim 1 further comprising flushing the cached data to the respectively mapped bank when the cached data is at least a size of a predetermined chunk of cached data.

3. The method of claim 1 further comprising sequentially energizing and deenergizing the banks according to a predetermined sequence that repeatedly de-energizes before reaching the respective bank's storage capacity.

4. The method of claim 2 wherein a first portion of a chunk of cached data is mapped to the first bank and a second portion of the chunk of cached data is mapped to the second bank.

5. The method of claim 4 further comprising initializing the second bank during the first time interval so that the second bank is energized for data transfer simultaneously to deenergizing the first bank.

6. The method of claim 1 wherein the cached data is a first cached data set contained in a first logical volume that is logically related to data transferred by the host, and wherein a second cached data set is contained in a second logical volume that is logically related to other data transferred by the host, further comprising mapping the first cached data set and the second cached data set to the first bank.

7. The method of claim 1 further comprising simultaneously energizing the first bank for data transfer and the second bank for data transfer in response to retrieving data from the storage controller.

8. The method of claim 1 wherein further comprising during the second time interval de-energizing the first bank of storage devices to disable data transfer in response to the energizing the second bank of storage devices.

9. An apparatus comprising:
   a plurality of storage devices, at least a first storage device of the plurality of storage devices defining a first bank and at least a second storage device of the plurality of storage devices defining a second bank;
   a data cache operably containing cache data received from a host pending transfer to the banks;
   a power manager module including computer instructions stored in computer memory and configured to be executed by computer processor to selectively energize the banks to enable data transfer and to de-energize the banks to disable data transfer in accordance with a longevity power profile configured to equalize utilizations of the banks, the longevity power profile during a first time interval causing the first bank to be energized and the second bank to be de-energized and during a subsequent, second time interval causing the second bank to be energized and the first bank to be de-energized, the second interval beginning before a storage capacity of the first bank is full; and a data transfer controller module including computer instructions stored in computer memory and configured to be executed by computer processor to map first cached data to the first bank during the first time interval and to map second cached data to the second bank during the second time interval.

10. The apparatus of claim 9 wherein the first and second cached data reside in a logical volume that is logically related to data transferred by the host.

11. The apparatus of claim 10 wherein the data transfer controller is configured to flush the cached data to the respective bank when the cached data in the logical volume is at least a size of a predetermined chunk of cached data.

12. The apparatus of claim 9 wherein at least a third storage device of the plurality is a spare for use in either of the banks.

13. The apparatus of claim 9 wherein the first bank is a first array of storage drives and the second bank is a second array of different storage drives.

14. The apparatus of claim 9 wherein the longevity power profile is configured to compare utilizations of the banks.

15. The apparatus of claim 9 wherein the longevity power profile is configured to compare power duty cycles of the storage devices.

16. The apparatus of claim 9 wherein the longevity power profile is configured to provide scheduled downtime of the banks.

17. The apparatus of claim 10 wherein the first cached data has a first portion that is mapped to the first bank and a second portion that is mapped to the second bank.

18. The apparatus of claim 10 wherein the first cached data is mapped to the first bank and the second cached data is mapped to the second bank.

19. The apparatus of claim 10 wherein the logical volume is a first logical volume, further comprising third cached data residing in a second logical volume that is logically different than the first logical volume and related to data transferred by the host, wherein the first cached data and the third cached data are mapped to the first bank.

20. A method comprising:

operating a storage server having access to a plurality of storage devices, at least a first storage device of the plurality of storage devices defining a first bank and at least a second storage device of the plurality of storage devices defining a second bank;

during a first time interval, energizing the first bank to enable data transfer, and de-energizing the second bank to disable data transfer;

during the first time interval, mapping data received from the storage server to the first bank;

during a second time interval that begins according to a longevity management logic configured to equalize utilizations of the banks and before a storage capacity of the first bank is full, de-energizing the first bank to disable data transfer, and energizing the second bank to enable data transfer; and during the second time interval, mapping the data received from the storage server to the second bank.

* * * * *